(12) United States Patent
Rodier

(10) Patent No.: US 6,651,613 B2
(45) Date of Patent: Nov. 25, 2003

(54) METHOD AND SYSTEM OF FUEL INJECTOR OPERATION

(75) Inventor: William J. Rodier, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 160 days.

(21) Appl. No.: 10/012,998

(22) Filed: Nov. 30, 2001

(65) Prior Publication Data

US 2003/0101964 A1 Jun. 5, 2003

(51) Int. Cl.$^7$ .................................................. F02B 3/00

(52) U.S. Cl. ........................ 123/299; 123/300; 123/436

(58) Field of Search .............................. 123/299, 300, 123/436, 480

(56) References Cited

U.S. PATENT DOCUMENTS

| | | | | |
|---|---|---|---|---|
| 6,073,608 A | * | 6/2000 | Krieger et al. ............... | 123/299 |
| 6,360,160 B1 | * | 3/2002 | Kanamaru et al. .......... | 701/104 |
| 6,363,315 B1 | * | 3/2002 | Love et al. .................. | 701/104 |
| 6,536,209 B2 | * | 3/2003 | Fluga et al. .................. | 60/284 |
| 6,557,779 B2 | * | 5/2003 | Perr et al. .................... | 239/96 |
| 6,561,157 B2 | * | 5/2003 | zur Loye et al. ........... | 123/295 |

* cited by examiner

Primary Examiner—John Kwon
(74) Attorney, Agent, or Firm—Mike Huber

(57) ABSTRACT

A method and system of fuel injector operation is provided in which the electronic control module (ECM) reduces the number of injection signals sent to the fuel injectors. Specifically, the ECM selects certain injectors to perform a post injector during a specific engine cycle and increase the quantity of fuel injected by the selected injectors to compensate for the other injectors that are not performing post injections during that engine cycle.

14 Claims, 2 Drawing Sheets

METHOD AND SYSTEM OF FUEL INJECTOR OPERATION

TECHNICAL FIELD

The present invention relates to a method and system of fuel injector operation and more specifically a method and system of fuel injector operation for post injections.

BACKGROUND

Fuel injector operation and control can have a profound impact on an injector's durability and long term performance. Further, injector operation and control can have a substantial effect on the engine's performance and durability itself, as well on related engine systems, such as the electronic control module (ECM). For example, the timing and number of fuel injection events per engine cycle impacts emissions. Currently, many engine manufacturers are researching multiple injections per cycle in order to reduce emissions. Specifically, a pilot injection could be used to enhance combustion, while a post injection could be used to help after-treatment. Unfortunately, each injection requires the injector to cycle or actuate, which causes additional wear on the injector. Further, the ECM must generate an actuation signal every time a fuel injector needs to inject. Therefore, using a combustion strategy that requires a pilot, main and post injection, the ECM would be required to generate three signals. Each signal requires the ECM to use additional energy and simultaneously creates more heat which can impact the longevity of the system.

The present invention is directed to overcoming one or more of the above stated problems.

SUMMARY OF THE INVENTION

In one embodiment of the present invention, a method of controlling post injections in a multicylinder internal combustion engine having a plurality of fuel injectors comprises: selecting one of the of fuel injectors and increasing the injection quantity for the selected injector and selecting another of the plurality of fuel injectors and decreasing the injection quantity for that injector.

In another embodiment of the present invention, a method of controlling post injections in a multicylinder internal combustion engine having a plurality of fuel injectors which receive a total duration of injections signals during each engine cycle from an electronic control module is provided. The total duration of injection signals comprises the sum of the individual injection signal components including a pilot injection signal, a main injection signal and a post injection signal during each injection cycle. The method comprises the steps of: selecting one of the plurality of fuel injectors and increasing the total duration of injection signals for said selected injector; and selecting another of the plurality of fuel injectors and decreasing the total duration of injection signals for said selected another injector.

In a third embodiment of the present invention, a fuel injection system for a multicylinder internal combustion engine comprises: a plurality of fuel injectors and an electronic control module to control when the fuel injectors perform an injection event including a post injection, wherein the electronic control module sends an increased duration post injection signal to one selected injector and sends a decreased duration post injection signal to another selected injector.

DETAILED DESCRIPTION

Figure 1:
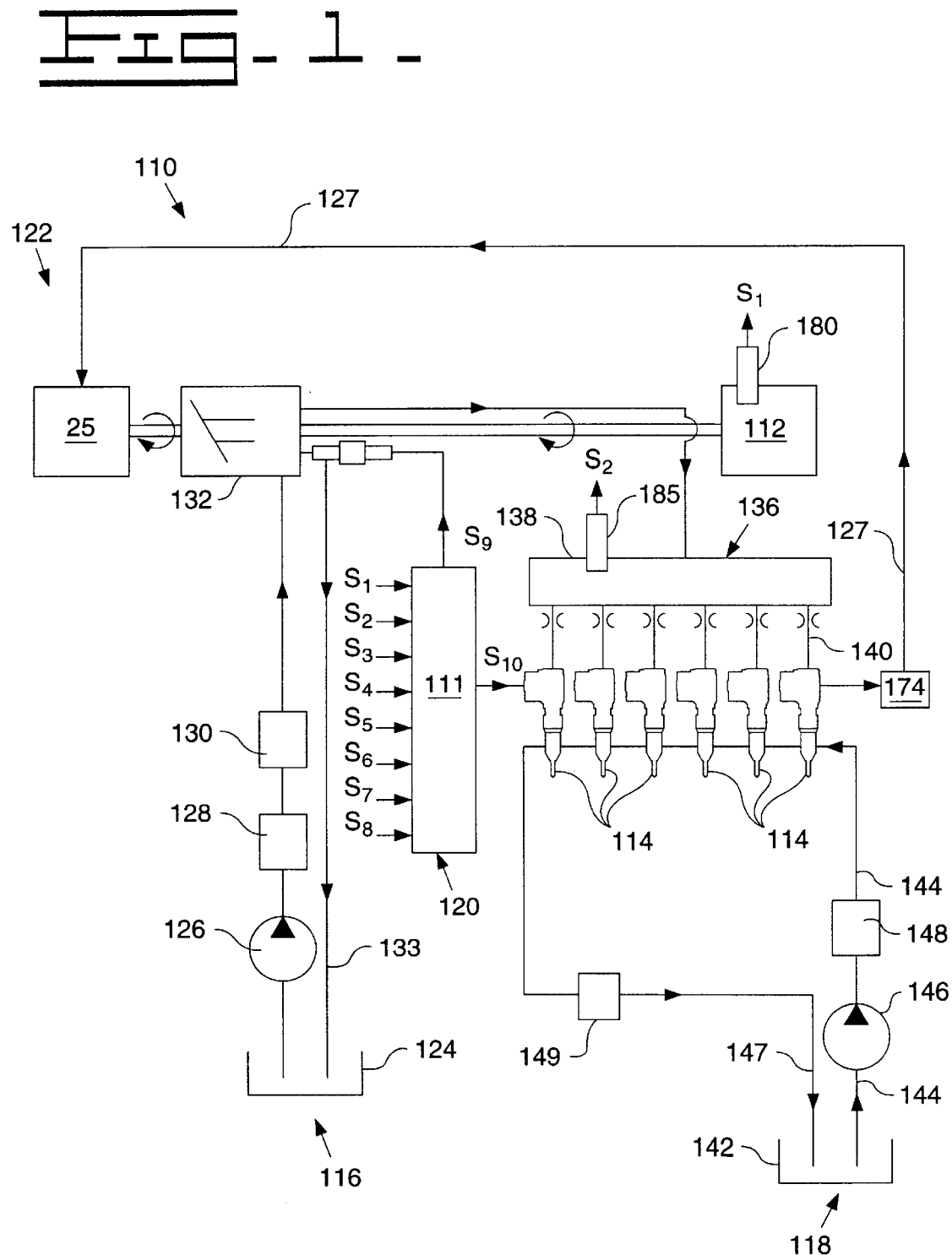
FIG. 1 is a schematic of a fuel injection system.

Referring to FIG. 1, there is shown an embodiment of a hydraulically-actuated electronically-controlled fuel injection system 110 in an example configuration as adapted for a direct-injection diesel-cycle internal combustion engine 112. Fuel system 110 includes one or more hydraulically-actuated electronically-controlled fuel injectors 114, positioned in a respective cylinder head bore (not shown) of engine 112. Fuel system 110 includes a first source of pressurized fluid flow, an apparatus or means 116 for supply actuating fluid to each injector 114, a second source of pressurized fluid flow 118 for supplying fuel to each injector, a computer 120 for electronically controlling the fuel injection system and an apparatus 122 for re-circulating actuation fluid leaving each of the injectors.

The first fluid source 116 preferably includes an actuating fluid sump 124, a relatively low pressure actuating fluid transfer pump 126, an actuating fluid cooler 128, one or more actuation fluid filters 130, a high pressure pump 132 for generating relatively high pressure in the actuation fluid and at least one relatively high pressure actuation fluid manifold 136. A common rail passage 138 is arranged in fluid communication with the outlet from the relatively high pressure actuation fluid pump 132. A rail branch passage 140 connects the actuation fluid inlet of each injector 114 to the high pressure common rail passage 136.

Actuation fluid leaving an actuation fluid drain of each injector 114 enters a re-circulation line 127 that carries the same to the hydraulic energy re-circulating apparatus 122. A portion of the re-circulated actuation fluid is channeled to high pressure actuation fluid pump 132 and another portion is returned to actuation fluid sump 124 via re-circulation line 133.

In a preferred embodiment, the actuation fluid is engine lubricating oil and the actuation fluid sump 124 is an engine lubrication oil sump. This allows the fuel injection system to be connected as a parasitic subsystem to the engine's lubricating oil circulation system.

The second fluid source 118 preferably includes a fuel tank 142, a fuel supply passage 144 arranged in fluid communication between fuel tank 142 and the fuel inlet of each injector 114, a relatively low pressure fuel transfer pump 146, one or more fuel filters 148, a fuel supply regulating valve 149, and a fuel circulation and return passage 147 arranged in fluid communication between injectors 114 and fuel tank 142.

The computer 120 preferably includes an electronic control module 111 including a microprocessor and memory. As is known to those skilled in the art, the memory is connected to the microprocessor and stores an instruction set and variables. Associated with the microprocessor and part of the electronic control module 111 are various other known circuits such as power supply circuitry, signal conditioning circuitry and solenoid driver circuitry, among others. The electronic control module 111 controls 1) the fuel injection timing; 2) the total fuel injection quantity during an injection cycle; 3) the fuel injection pressure; 4) the number of separate injections or injection segments during each injection cycle; 5) the time intervals between the injection segments; 6) the fuel quantity of each injection segment during an injection cycle; 7) the actuation fluid pressure; 8) current level of the injector waveform; and 9) any combination of the above parameters. Computer 120 receives a plurality of sensor input signals S1–S8, which correspond to known sensor inputs, such as engine operating conditions including engine speed, engine temperature, pressure of the actuation fluid, load on the engine, etc., that are used to determine the precise combination of injection parameters for a subsequent injection cycle.

For example, an engine temperature sensor 180 is shown connected to the engine 112. In one embodiment, the engine temperature sensor includes an engine oil temperature sensor. However, an engine coolant temperature sensor can also be used to detect the engine temperature. The engine temperature sensor produces a signal designated by S1 in FIG. 1 and is input to the computer 120 over line S1. Another example of an engine sensor input is a rail pressure sensor 185 shown connected to the high pressure common rail 138 for producing a high pressure signal S2 responsive to the pressure of the actuating fluid. The electronic control module 111 inputs the high pressure signal on input S2.

In this example, computer 120 issues control signal S9 to control the actuation fluid pressure and a fuel injection signal S10 to energize a solenoid within a fuel injector thereby controlling fluid control valve(s) within each injector 114 and causing fuel to be injected into a corresponding engine cylinder. Each of the injection parameters are variably controllable, independent of engine speed and load. In the case of injector 114, control signal S10 is a fuel injection signal that is a computer commanded current to the injector solenoid.

Figure 2:
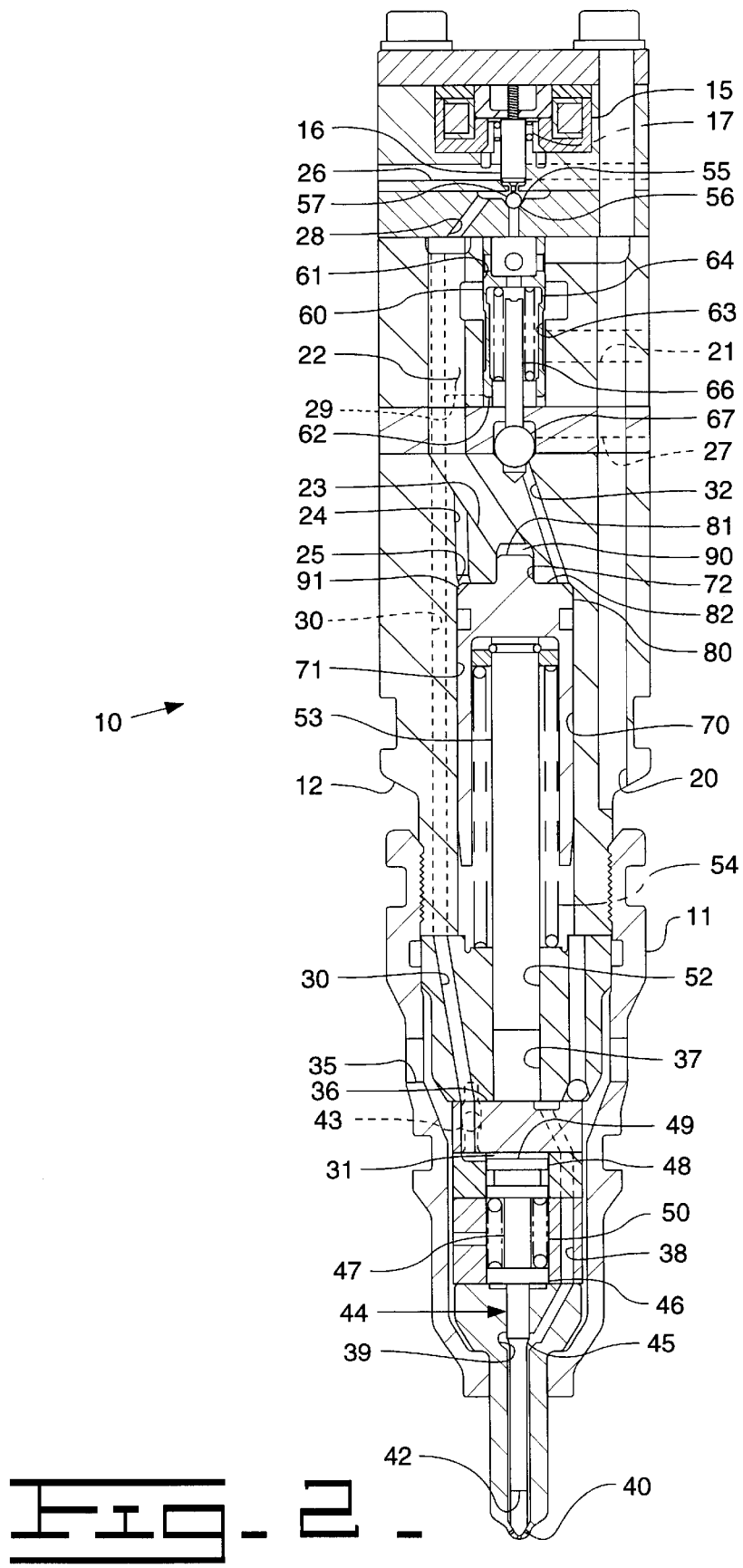
FIG. 2 is a longitudinal cross section of a hydraulically actuated electronically controlled fuel injector.

Referring now to FIG. 2, a longitudinal cross section of a hydraulically actuated electronically controlled fuel injector 114 which may be used in connection with the present invention is shown. Fuel injection is controlled by applying an electrical current in the form of the fuel injection signal to a two-way solenoid valve 15, which is attached to a pin 16 and biased toward a retracted position by a spring 17. The actuation fluid control valve also includes a ball valve member 55, and a spool valve member 60. Ball valve member 55 is positioned between a high pressure seat 56 and a low pressure seat 57. When solenoid 15 is deactivated, high pressure actuation fluid acting on ball valve member 55 holds the same in low pressure seat 57 to close actuation fluid drain 26. When solenoid 15 is activated, pin 16 moves downward contacting ball valve member 55 and pushing it downward to close high pressure seat 56 and open low pressure seat 57. By actuating the solenoid 15 and seating the ball valve member 55 in the high pressure seat 56, the injector begins to inject fuel. For a more detailed explanation of one preferred embodiment of a hydraulically actuated electronically controlled unit injector, as shown in FIG. 2, reference should be made to U.S. Pat. No. 5,826,562.

Attention is now turned to the ECM 111 and the control of fuel injection. Post injections may be required for after-treatment. In one mode, a post injection puts unburned fuel into the cylinder exhaust stream to help the catalyst in the after-treatment system remove unwanted contaminants. In the prior art, each injector 114 would perform a post injection, requiring the ECM 111 to send a post injection signal to every injector each time a post injection was desired. These post injections create additional wear on the injector 114 as well as cause the ECM 111 to use additional energy and create additional heat which can reduce the lifetime of the ECM and its surrounding components.

The ECM 111 can reduce the number of injections and signals generated by "combining" post injections and alternating which injectors perform the "combined" post injection. For example, in a six cylinder engine, as shown in FIG. 1, injectors one, three, and five could perform post injections in one engine cycle and injectors two, four, and six could perform post injections in the next cycle. This reduces the number of signals that the ECM 1111 needs to produce as well as limits the injector 114 wear by reducing the number of injector actuations. However, even though reducing the number of post injections may reduce wear on the ECM 111 and the injector 114, the after-treatment may suffer. Therefore, it may be necessary to increase the quantity of fuel injected in each post injection to make up for the fact that only every other injector is performing a post injection. In the present example, the post injection could be doubled or "combined". By doubling the quantity of the post injection, the actuation signal sent by the ECM 111 to the injector 114 must be longer but this does not strain the system in the same way that sending a new signal would. It does not take as much energy or create as much heat to extend a signal as it does to create a new signal. Therefore, even though the post injection signals sent by the ECM 111 may be longer, less energy is used and less heat is created.

In the previous example, a post injection was performed by every other injector 114; however, other arrangements could be possible. For example, one could perform one post injection for every three injectors. The exact combination used may depend upon the number of cylinders an engine has and the needs of the after-treatment system. The quantity of fuel and duration of the post injection will vary with each specific combination based upon the goals and needs of the system. Additionally, the description above used a hydraulically actuated electronically controlled fuel injector for demonstration, however, the present invention could be used with other injector types including, electronically controlled unit injectors and common rail injectors. Finally, it should be noted that this description often refers to the duration of an injector signal in relation to increasing the quantity of fuel injected. It is possible to inject more fuel with the same or shorter duration signal by controlling the injection pressure; therefore, one skilled in the art would realize that duration and quantity can be interchanged to achieve the same results.

INDUSTRIAL APPLICABILITY

The present invention reduces injector 114 and ECM 111 wear by controlling post injections. In the past, post injections were performed by every injector but the present invention reduces the number of post injections while preserving after-treatment benefits. With the present invention, post injections are alternated between the injectors 114 but the duration or injection quantity of the post injection is increased to compensate for the smaller number of injections. By reducing the number of injections, the injector 114 does not experience as much wear, because each injector does not perform a post injection every engine cycle. Further, the ECM 111 does not need to produce as many actuation signals, which results in less energy being used by the engine system, therefore enhancing efficiency, and the ECM produces less heat which helps extend the lifetime of the system components. Further, less heat reduces the amount of cooling and cooling components that would otherwise be necessary to maintain the system.

Other aspects, features, and advantages of the present invention may be obtained from a study of this disclosure and the drawings, along with the appended claims.

What is claimed is:

1. A method of controlling a post injection in a multicylinder internal combustion engine having a plurality of fuel injectors, each of said plurality of fuel injectors having an injection quantity, comprising:

selecting one of said plurality of fuel injectors;

increasing said injection quantity for said selected injector;

selecting another of said plurality of fuel injectors; and decreasing said injection quantity for said another injector.

2. The method of claim 1 further comprising selecting one of said plurality of fuel injectors to perform said post injection during a first engine cycle and selecting a different injector from said plurality of fuel injectors during a second engine cycle.

3. The method of claim 1 further comprising selecting a first set of injectors from said plurality of fuel injectors to perform said post injection in a first engine cycle and selecting a different set of injectors from said plurality of fuel injectors to perform said post injection in a second engine cycle.

4. The method of claim 1 where in the step of increasing said injection quantity is performed by increasing said post injection quantity.

5. The method of claim 1 wherein the step of decreasing said injection quantity is performed by decreasing said post injection quantity.

6. A method of controlling a post injection in a multicylinder internal combustion engine having a plurality of fuel injectors which receive a total duration of injections signals during each engine cycle from an electronic control module, said total duration of injection signals comprising the sum of the individual injection signal components including a pilot injection signal, a main injection signal and said post injection signal during each said injection cycle, the method comprising the steps of:

selecting one of said plurality of fuel injectors;

increasing said total duration of injection signals for said selected injector;

selecting another of said plurality of fuel injectors; and decreasing said total duration of injection signals for said selected another injector.

7. The method of claim 6 wherein increasing said total duration of injection signals includes increasing said post injection signal duration.

8. The method of claim 6 wherein decreasing said total duration of injection signals includes decreasing said post injection signal duration.

9. The method of claim 6 further comprising selecting one of said plurality of fuel injectors to perform said post injection during a first engine cycle and selecting a different injector from said plurality of fuel injectors during a second engine cycle.

10. The method of claim 6 further comprising selecting a first set of injectors from said plurality of fuel injectors to perform said post injection in a first engine cycle and selecting a different set of injectors from said plurality of fuel injectors to perform said post injection in a second engine cycle.

11. The method of claim 6 further comprises reducing the number of post injection signals sent by said electronic control module to said plurality of fuel injectors during any given engine cycle and increasing the duration of the post injection signals sent to said selected injectors.

12. A fuel injection system for a multicylinder internal combustion engine comprising:

a plurality of fuel injectors, and an electronic control module to control when said fuel injectors perform an injection event including a post injection, wherein said electronic control module sends an increased duration post injection signal to one selected injector and sends a decreased duration post injection signal to another selected injector.

13. The system of claim 12 wherein said electronic control module selects one injector for performing said injection during a first engine cycle and selects another injector in a second engine cycle.

14. The system of claim 12 wherein said electronic control module selects a first set of injectors from said plurality of fuel injectors to perform said post injection in a first engine cycle and selects a different set of injectors from said plurality of fuel injectors to perform said post injection in a second engine cycle.

* * * * *